United States Patent [19]

Sakurai et al.

[11] 4,205,390

[45] May 27, 1980

[54] ADDRESS CONVERTER

[75] Inventors: Kiyoshi Sakurai; Tateo Matsumoto, both of Hiratsuka; Teruo Ishikawa, Yokohama, all of Japan

[73] Assignee: Honeywell Inc., Minneapolis, Minn.

[21] Appl. No.: 945,444

[22] Filed: Sep. 25, 1978

[51] Int. Cl.² .................. G06F 5/00; G06F 13/00
[52] U.S. Cl. .................................................. 364/900
[58] Field of Search ... 364/200 MS File, 900 MS File; 365/230, 231

[56] References Cited

U.S. PATENT DOCUMENTS 3,818,459  6/1974  Vrablik ............................ 364/200

*Primary Examiner*—Raulfe B. Zache

*Attorney, Agent, or Firm*—Laurence J. Marhoefer; Lockwood D. Burton; Mitchell J. Halista

[57] ABSTRACT

An address converter for decoding a multi-bit binary address has a binary adder to provide a logic subtraction of binary bit information introduced by a plurality of manually settable switches from a predetermined number of most significant binary bits in an address signal, an address-decode circuit for receiving an output signal from the adder and the next order of magnitude of the binary bits in the address signal and a plurality of system subunits which receive an output signal from the address-decode circuit and the remaining least significant bit information in the address signal to access the subunits according to the address signal and the switch settings in a predetermined order.

6 Claims, 2 Drawing Figures

ADDRESS CONVERTER

BACKGROUND OF THE INVENTION

Field of the Invention

The present invention relates to digital address converters. More specifically, the present invention relates to a digital address converter for decoding a multi-bit binary address to provide access to addressable subunits using arbitrary address information.

SUMMARY OF THE INVENTION

An object of the present invention is to provide an improved address converter for providing system access using arbitrary address information.

Another object of the present invention is to provide an improved address converter for producing continuous address information even when the number of addressed system units is less than the unit selection capability number of the address circuit.

In accomplishing these and other objects, there has been provided, in accordance with the present invention, an address converter wherein address shift information which is given by selective operation of switches is subtracted from predetermined bits of address information comprising most significant bit address signals of an aribitrarily determined number by using a subtractor to carry out the address conversion whereby when a plurality of system sub-units are accessed by the converted address information, only the subunit having the unit-address region corresponding to said converted address information is accessed.

BRIEF DESCRIPTION OF THE DRAWING

A better understanding of the present invention may be had when the following detailed description is read in connection with the accompanying drawings, in which.

DETAILED DESCRIPTION OF THE PREFERRED EMBODIMENT

Figure 1:
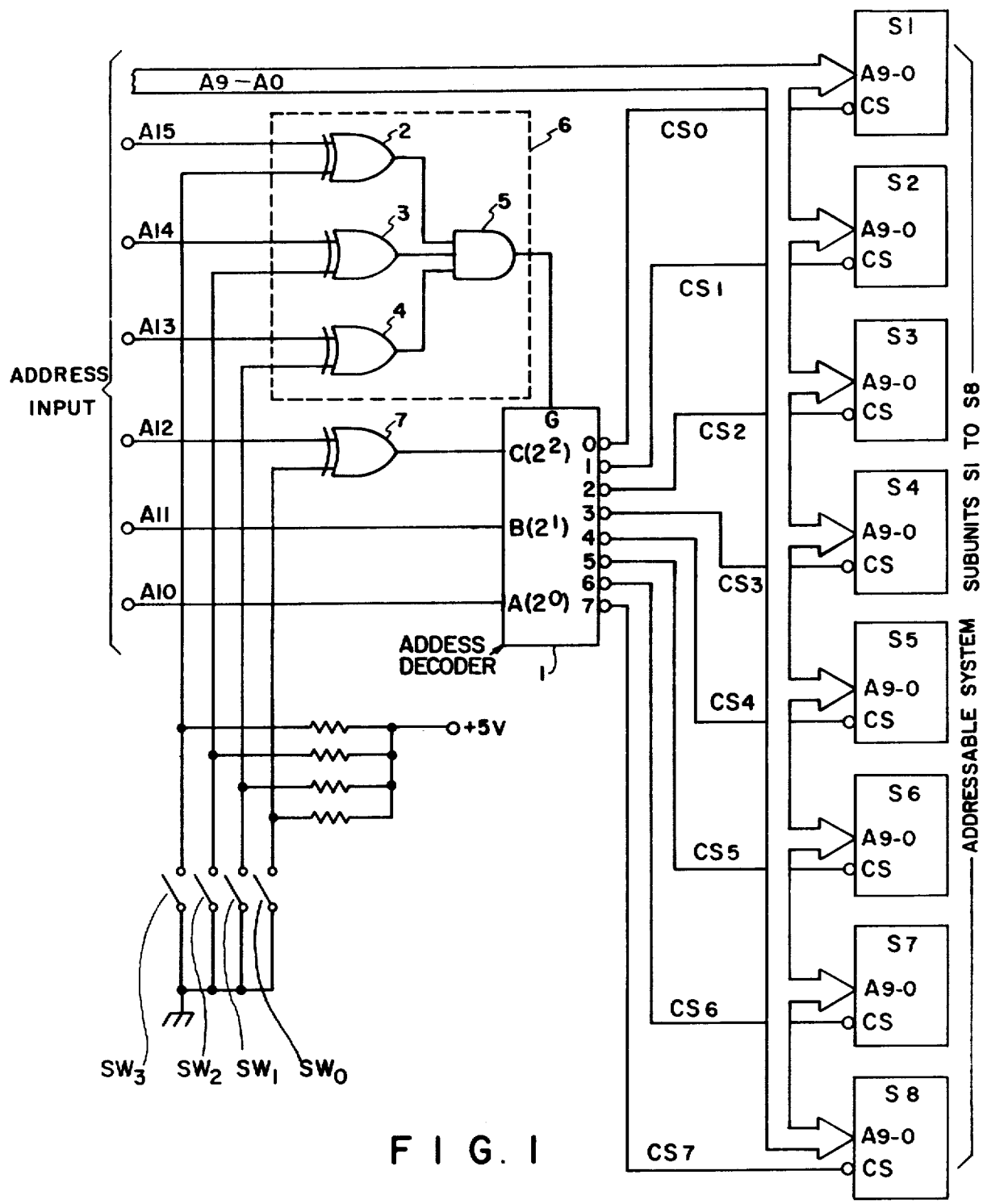
FIG. 1 is a block diagram of a prior art address converter.

Detailed Description Of FIG. 1

Referring to FIG. 1 in more detail there is shown a prior art address converter having an address-decode circuit 1 which may be any suitable decoder capable for accepting a plurality of parallel digital bit signals and producing a decoded output signal on a plurality of output lines, such devices being well-known in the art. A plurality of binary bit address signals, i.e., sixteen bit address signals $A_0$ to $A_{15}$, are applied from an external source (not shown) to the address converter shown in FIG. 1.

In the address converter of this kind, the input to an address-decode circuit is not given by converting address information itself, but the address-decoder circuit is enabled to access subunits constituting the system when address information that coincides with address shift information given by switching means is an input thereto. The lower ten bit address signals $A_9$–$A_0$ among the address signals $A_{15}$–$A_0$ are applied in parallel to eight system subunits $S_1$ and $S_8$ each of which each holds 1024 addresses. Address signals $A_{12}$–$A_{10}$ are applied to the address-decode circuit 1 which is adapted to decode the signals $A_{12}$–$A_{10}$ to supply corresponding subunit selection signals $CS_0$–$CS_7$ to system subunits $S_1$–$S_8$. Address signals $A_{15}$–$A_{13}$ are applied to one input of respective exclusive OR gates (EX–OR) 2, 3 and 4 which with an AND gate 5 constitute a coincidence circuit 6. The other inputs of said EX–OR gates 2, 3, 4 are connected to switches $SW_1$–$SW_3$ for giving address shift signals. Address signal $A_{12}$ is supplied to the address-decode circuit 1 through EX–OR gate 7.

MODE OF OPERATION OF FIG. 1

In the address converter shown in FIG. 1, the input to the address-decode circuit 1 is not obtained by converting address information itself but the address-decode circuit 1 is enabled to access subunits $S$–$S_8$ of the system when address information that coincides with address shift information given by the switching means $SW_1$–$SW_3$ is supplied thereto. The operation of the circuit of FIG. 1 will be described by using a specific example. When the switch $SW_3$ is OFF while the switches $SW_2$ and $SW_1$ are ON, and address signals $A_{15}$–$A_0$ are $60000_8$–$77777_8$ (binary-coded octal), the output of the coincidence circuit 6 becomes an "H", i.e., high, level to activate the address-decode circuit 1. Accordingly, the system subunits $S_1$–$S_8$ are accessed by the address signals. The order of accessing subunits $S_1$–$S_8$ is either the order of $S_1, S_2, \ldots S_8$ or the order of $S_5, S_6 \ldots S_8$, and $S_1, \ldots S_4$, which depends on the state of the switch $SW_0$. In other words, when switch $SW_0$ is ON, the former order is realized while the latter takes place when switch $SW_0$ is OFF. Specifically, memory addresses of the system subunits $S_1$–$S_8$ for the address signal information $60000_8$–$77777_8$ are allocated as indicated in Tables 1 and 2.

Table 1

| Subunit Address ($SW_0$ : On) | |
|---|---|
| $S_1$ | $60000_8$–$61777_8$ |
| $S_2$ | $62000_8$–$63777_8$ |
| $S_3$ | $64000_8$–$65777_8$ |
| $S_4$ | $66000_8$–$67777_8$ |
| $S_5$ | $70000_8$–$71777_8$ |
| $S_6$ | $72000_8$–$73777_8$ |
| $S_7$ | $74000_8$–$75777_8$ |
| $S_8$ | $76000_8$–$77777_8$ |

Table 2

| Subunit Address ($SW_0$ : Off) | |
|---|---|
| $S_1$ | $70000_8$–$71777_8$ |
| $S_2$ | $72000_8$–$73777_8$ |
| $S_3$ | $74000_8$–$75777_8$ |
| $S_4$ | $76000_8$–$77777_8$ |
| $S_5$ | $60000_8$–$61777_8$ |
| $S_6$ | $62000_8$–$63777_8$ |
| $S_7$ | $64000_8$–$65777_8$ |
| $S_8$ | $66000_8$–$67777_8$ |

For simplifying the explanation, each of the addresses 1024 held by each system subunit $S_1$–$S_8$ will be called the address 1K hereinafter. According to this address indication, the address signal of the three bit signals which constitute the minimum address information and are given to the coincidence circuit 6 is an 8K address ($2^{13}$) that is represented by $A_{13}$. Accordingly, in this prior art circuit, address information to which subunits $S_1$–$S_8$ respond can be shifted by taking the 8K address as a unit. More particularly, a unit address region of 8K held by subunits $S_1$–$S_8$ is used according to the address shift as shown in Table 3 by selectively operating the switches $SW_1$–$SW_2$.

Table 3

| Switches | | | Address Information | |
|---|---|---|---|---|
| $SW_1$ | $SW_2$ | $SW_3$ | Beginning | End |
| X | X | X | 0 | $177777_8$ |
| O | X | X | $20000_8$ | $37777_8$ |
| X | O | X | $40000_8$ | $57777_8$ |
| O | O | X | $60000_8$ | $77777_8$ |
| X | X | O | $100000_8$ | $117777_8$ |
| O | X | O | $120000_8$ | $137777_8$ |
| X | O | O | $140000_8$ | $157777_8$ |
| O | O | O | $160000_8$ | $177777_8$ |

Where X = OFF, O = ON

In the prior art circuit as mentioned above, however, the beginning of address information becomes always n-times the 8K addresses, where "n" is 1, 2, ... 6 or 7. Accordingly, as may be seen from Table 3, the beginning of the address information for accessing subunits $S_1$–$S_8$ is always 0, 8K, 16K, ... 48K or 56K. Accordingly, in the case of letting the address information with 4K–12K for example correspond to subunits $S_1$–$S_8$, only a half of the unit address region can be used, so that the efficiency of using unit address is made half or less. Further, where the subunits $S_1$–$S_8$ are actually installed on a memory board or the like and the number of installed subunits are less than the subunit selection number of the address-decode circuit 1, the address information to access the installed subunits becomes discontinuous. For instance, when subunits $S_6$–$S_8$ are not installed and switch $SW_0$ is OFF, as seen from Table 2, address information to access subunits $S_1$–$S_5$ becomes discontinuous between $61777_8$ and $70000_8$ in the unit-address region of the 8K addresses. This provides an imepdiment against an efficient use of the system subunits.

DESCRIPTION OF FIG. 2

Figure 2:
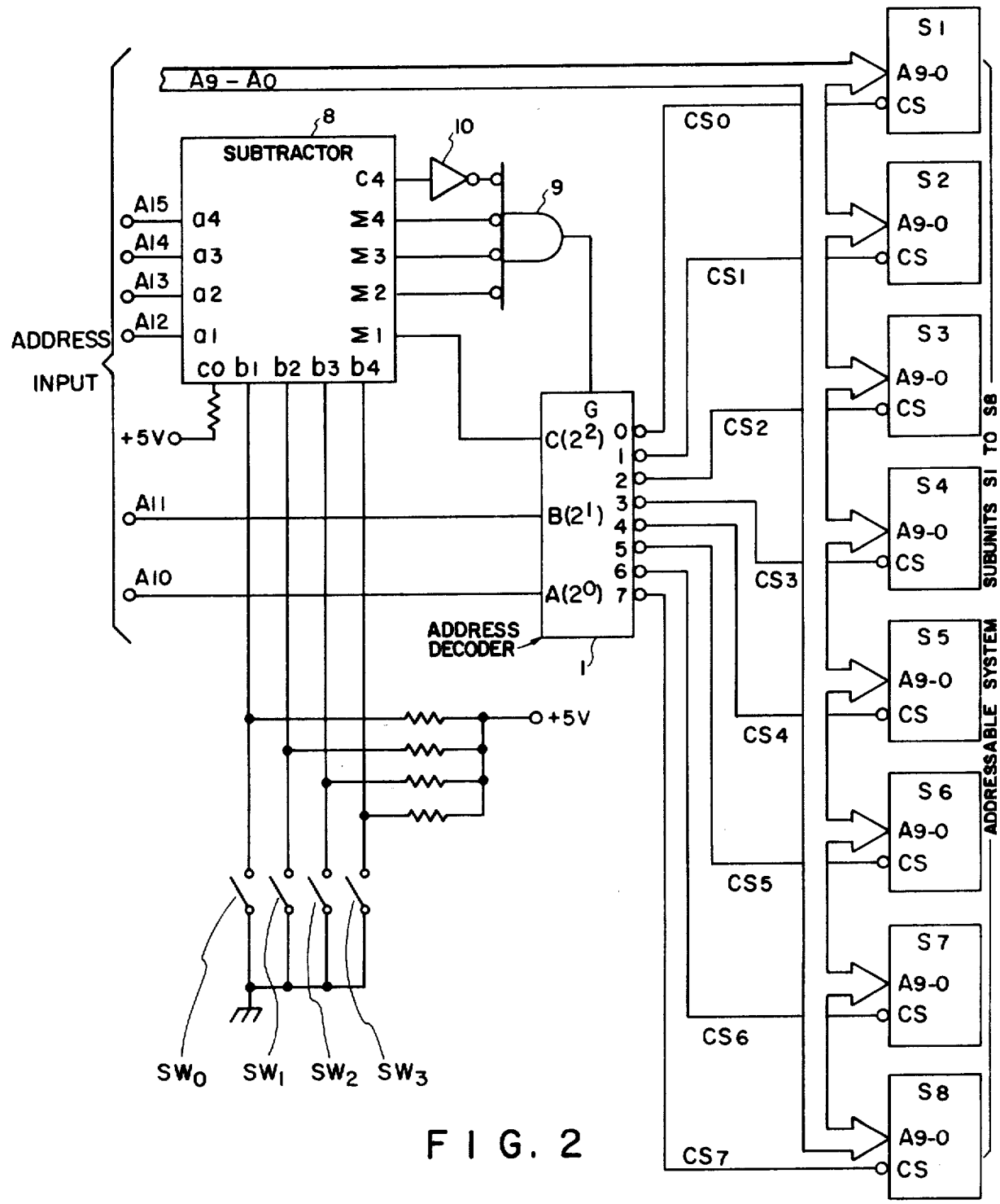
FIG. 2 is a block diagram of an example of an address converter embodying the present invention.

In FIG. 2, there is shown a circuit diagram of an example of an address converter embodying the present invention. Similar elements appearing in FIGS. 1 and 2 bear like symbols and numbers. In FIG. 2, a subtractor 8 receives binary bit address signals $A_{15}$–$A_{12}$ that are the upper 4 bits of address signals $A_{15}$–$A_0$ at its first inputs $a_1$–$a_4$. The subtractor 8 also receives address information given by switches $SW_0$–$SW_3$ at its second inputs $b_1$–$b_4$. A NOR gate 9 receives, at its NOR inputs, first outputs $\Sigma_2$, $\Sigma_3$, $\Sigma_4$, from the subtractor 8 as well as the inverted output of fixed carrier output $C_4$. The NOR gate 9 produces an output which applied as an enabling signal to the G input of the an address-decode circuit 1 when the condition $\overline{\Sigma_2}.\overline{\Sigma_3}.\overline{\Sigma_4}.C_4$ is satisfied at the inputs of the NOR circuit 9. An inverter 10 in the $C_4$ output line prevents subunits $S_5$–$S_8$ from being accessed by address information 0–4K when the address shift is set as 60K (in case the entire address is 64K and switches $SW_0$–$SW_3$ are ON). Address signals $A_{11}$ and $A_{10}$ and a second output $\Sigma_1$ of the subtractor 8 are applied as inputs to the address-decode circuit 1. Lower binary bit address signals $A_9$–$A_0$ are applied in parallel to subunits $S_1$–$S_8$. In this embodiment, a four bit binary adder is utilized as the subtractor 8, so that by letting the adder perform subtraction, address shift information by switches $SW_0$–$SW_3$ ("1"=TRUE=ON) are added as a complement and a "1" ("H" level) is added by a carrier input $C_0$ from the lower order.

OPERATION OF FIG. 2

Generally, if it is possible to arbitrarily set address allocation to subunits constituting the system or to access the same by using arbitrary address information, a large flexibility would be expected when designing or using the system. The main function of this circuit is to subtract the address shift information given by switches $SW_0$–$SW_3$ from the address information (0–$177777_8$) comprising address signals $A_{15}$–$A_0$. The minimum of address shift information is $10000_8$ when $SW_0$ is ON while the maximum is $170000_8$ when $SW_0$–$SW_3$ are all ON (when all switches $SW_0$–$SW_3$ are OFF, the address shift information is 0). In other words, the address information $A_{15}$–$A_0$ is shifted to the minus side by address shift information [obtained by integrally multiplying $10000_8$ (4K address)] that is selectively given by $SW_0$–$SW_3$. Specifically, address information comprising the upper 3 bits address signal $A_{15}$–$A_{13}$ is converted to 0 address, and subunits $S_1$–$S_8$ are accessed by remaining address signals $A_{12}$–$A_0$ beginning from the subunit $S_1$. The subtractor 8 is operated as follows. Letting the address shift information from switches $SW_0$–$SW_3$ be $\overline{SW_0}$, $\overline{SW_1}$, $\overline{SW_2}$ and $\overline{SW_3}$ (Closing $SW_0$–$SW_3$ = "L" level = "0"), address information comprising the upper 4 bits of address signals be $AD_4$, $A_3$, $AD_2$ and $AD_1$ ("H" level = "1"), address information comprising the converted upper 4 bits would be $\Sigma_4$, $\Sigma_3$, $\Sigma_2$, and $\Sigma_1$ ("H" level = "1"), while the subtraction formula is expressed as follows:

$$\begin{array}{r} AD_4 \ AD_3 \ AD_2 \ AD_1 \\ - \overline{SW_3} \ \overline{SW_2} \ \overline{SW_1} \ \overline{SW_0} \\ \hline \Sigma_4 \ \Sigma_3 \ \Sigma_2 \ \Sigma_1 \end{array} \qquad (1)$$

In the present embodiment, since the adder is used as the subtractor 8, $\overline{SW_3}$, $\overline{SW_2}$, $\overline{SW_1}$ and $\overline{SW_0}$ are added by taking their complement as shown in the following formula (2)

$$\begin{array}{r} AD_4 \ AD_3 \ AD_2 \ AD_1 \\ + SW_3 \ SW_2 \ SW_1 \ SW_0 \\ \hline \Sigma_4 \ \Sigma_3 \ \Sigma_2 \ \Sigma_1 \end{array} \qquad (2)$$

In the case, for example, when $SW_3$ is OFF, $SW_2$ ON, $SW_3$ is ON and $SW_0$ is ON, the address information comprising signals $A_{15}$–$A_0$ is converted as shown in Table 4.

Table 4

| Address Information before conversion | Address Information after conversion |
|---|---|
| 0 | $110000_8$ |
| $67777_8$ | $177777_8$ |
| $70000_8$ | 0 |
| $177777_8$ | $107777_8$ |

Accordingly, only when address information comprising the upper 3 bits $\Sigma_4$, $\Sigma_3$ and $\Sigma_2$ is 0, subunits $S_1$–$S_8$ are accessed in order beginning from the subunit $S_1$. Namely, when the input to the NOR circuit 9 is $\overline{\Sigma_4}$. $\overline{\Sigma_3}$. $\overline{\Sigma_2}$. $C_4$, the address-decode circuit 1 is enabled, thereby subunits $S_1$–$S_8$ being accessed by address information comprising address signals $A_0$–$A_{11}$ and $\Sigma_1$. This accessing is always carried out in the order of subunits $S_1$, $S_2$, ... $S_8$, because the enable state of the address-decode circuit 1 is always commenced from address information (address signals $A_{15}$–$A_0$) that is $\bar{\Sigma}_1.\bar{\Sigma}_2.\bar{\Sigma}_3.\bar{\Sigma}_4$. Therefore, according to the present circuit, as shown in Table 5, subunits $S_1-S_8$ are accessed in order by the address information that is obtained by integrally multiplying 4K address. Further, since the subunit $S_1$ is always accessed at first, subunits $S_1-S_5$ are continuously accessed even when subunits $S_6-S_8$ are actually not installed, thus the use of system becomes easier and the efficiency of system utilization is enhanced.

Table 5

| Beginning Address | Switches | | | | Beginning Address | Switches | | | |
|---|---|---|---|---|---|---|---|---|---|
| | $SW_3$ | $SW_2$ | $SW_1$ | $SW_0$ | | $SW_3$ | $SW_2$ | $SW_1$ | $SW_0$ |
| | X | X | X | X | $100000_8$ | O | X | X | X |
| $10000_8$ | X | X | X | O | $110000_8$ | O | X | X | O |
| $20000_8$ | X | X | O | X | $120000_8$ | O | X | O | X |
| $30000_8$ | X | X | O | O | $130000_8$ | O | X | O | O |
| $40000_8$ | X | O | X | X | $140000_8$ | O | X | O | X |
| $50000_8$ | X | O | X | O | $150000_8$ | O | O | X | O |
| $60000_8$ | X | O | O | X | $160000_8$ | O | O | O | X |
| $70000_8$ | X | O | O | O | $170000_8$ | O | O | O | O |

Where O : Switch ON  X : Switch OFF

As described hereinbefore, when the address shift is set as 60K address (all of $SW_0$-$SW_3$ are ON) subunits $S_5-S_8$ having the latter half of the unit-address region are not used.

As discussed above, according to the present invention, subunits $S_1-S_8$ are accessed by arbitrary address information of which the beginning is obtained by integrally multiplying 4K addresses. Further, even in absence of installation of subunits $S_6-S_8$, subunits $S_1-S_5$ are accessed in order with continuous address information.

In the embodiment described above, it has been described that the beginning of the address information to access subunits $S_1-S_8$ is obtained by integrally multiplying 4K addresses. However, since addressing is performed by using the subtractor 8 in this invention, if the circuit is constituted such that the minimum unit of address information and address shift information given as input to the subtractor 8 is 2K addresses for example, subunits are accessed by address information of which the beginning is obtained by integrally multiplying 2K addresses. In the embodiment shown herein, address shift information is introduced by using separate switches. However, it is apparent that other input devices such as a four bit register may be used for that purpose.

Accordingly, it may be seen that there has been provided, in accordance with the present invention, an improved address converter wherein the subunit system having a certain address region is accessed by using arbitrary address information as the beginning of address information. Further, even when the number of subunits is smaller than the subunit selection number of the address-decode circuit, subunits are addressed in a predetermined order by continuous address information.

The embodiments of the invention in which an exclusive property or privilege is claimed are defined as follows:

1. An address converter for decoding a multi-bit address comprising:
   switching means for selectively supplying binary bit logic signals,
   a subtraction circuit means connected to said switching means for subtracting bit information supplied by said switching means from a desired number of the most significant bit information in the address signal input to the subtractor circuit means,
   an address-decode circuit means which receives as its input a first and a second output logic signal from said subtraction circuit and the intermediate order bit information in the address signal to produce one of a plurality of output signals as a decoded representation thereof, and
   a plurality of system subunits each of which receives a respective output from said address-decode circuit means as well as all of the remaining least significant bit information to access one of said subunits.

2. An address converter as set forth in claim 1 wherein said switching means includes a manually presettable switch means for each bit of information supplied by said switching means.

3. An address converter as set forth in claim 1 wherein said subtraction circuit means includes a binary logic adder for adding the complement of the logic signals from said switching means to the most significant bits of the address signal.

4. An address converter as set forth in claim 1 wherein said subtraction circuit means include a NOR gate means, first circuit means for applying all of the results of each of the bit subtraction operations by said subtraction circuit means to said NOR gate means to produce said first output logic signal and second means for applying said first signal as an enabling signal to said decode means.

5. An address converter as set forth in claim 1 wherein said second output logic signal from said subtraction circuit means is the result of a subtraction of an address bit in the multi-bit address and one of the binary bit signals from said switching means and is decoded along with two intermediate bits in the multi-bit address.

6. An address converter as set forth in claim 1 wherein the multi-bit address is a sixgteen bit word, said most significant bits are four bits, and intermediate bits are two bits, said least significant bits are ten bits and said system subunits are ten subunits.

* * * * *